United States Patent
Isomäki et al.

(10) Patent No.: US 12,267,891 B2
(45) Date of Patent: Apr. 1, 2025

(54) DETECTION AND TRIGGERING FOR UE-TO-UE P2P TRAFFIC FLOW ROUTING OPTIMIZATION

(71) Applicant: Nokia Technologies Oy, Espoo (FI)

(72) Inventors: Markus Sakari Isomäki, Espoo (FI); Pekka Juhani Korja, Kauniainen (FI)

(73) Assignee: Nokia Technologies Oy, Espoo (FI)

( * ) Notice: Subject to any disclaimer, the term of this patent is extended or adjusted under 35 U.S.C. 154(b) by 475 days.

(21) Appl. No.: 17/774,628

(22) PCT Filed: Nov. 6, 2020

(86) PCT No.: PCT/EP2020/081335
§ 371 (c)(1),
(2) Date: May 5, 2022

(87) PCT Pub. No.: WO2021/089811
PCT Pub. Date: May 14, 2021

(65) Prior Publication Data
US 2022/0377820 A1    Nov. 24, 2022

(30) Foreign Application Priority Data
Nov. 8, 2019  (EP) ..................... 19207919

(51) Int. Cl.
*H04W 76/12* (2018.01)
*H04L 67/104* (2022.01)
*H04W 40/02* (2009.01)

(52) U.S. Cl.
CPC ........... *H04W 76/12* (2018.02); *H04L 67/104* (2013.01); *H04W 40/02* (2013.01)

(58) Field of Classification Search
CPC ....... H04W 76/12; H04W 40/02; H04W 4/02; H04L 67/104; H04L 67/142
See application file for complete search history.

(56) References Cited

U.S. PATENT DOCUMENTS

2013/0303139 A1* 11/2013 Helfre ................ H04W 52/028
455/417
2019/0158408 A1* 5/2019 Li ......................... H04W 72/56
(Continued)

FOREIGN PATENT DOCUMENTS

WO   2019/042912 A1   3/2019
WO   2019/212543 A1   11/2019

OTHER PUBLICATIONS

"3rd Generation Partnership Project; Technical Specification Group Services and System Aspects; Procedures for the 5G System; Stage 2 (Release 16)", 3GPP TS 23.502, V16.0.2, Apr. 2019, pp. 1-419.
(Continued)

*Primary Examiner* — Kodzovi Acolatse
*Assistant Examiner* — Anindita Sen
(74) *Attorney, Agent, or Firm* — Robert P. Michal, Esq.; Carter, DeLuca & Farrell LLP

(57) ABSTRACT

An apparatus is provided which comprises at least one processor and at least one memory including computer program code, the at least one memory and the computer program code configured to, with the at least one processor, cause the apparatus at least to perform: detecting whether a first user equipment is present in an area served by a user plane function, and, when it is detected that the first user equipment is present in the area served by the user plane function, storing information about the presence of the first user equipment and controlling whether and when to allocate the first user equipment to the user plane function based on the stored information.

1 Claim, 8 Drawing Sheets

(56) References Cited

U.S. PATENT DOCUMENTS

| | | | |
|---|---|---|---|
| 2021/0029770 A1* | 1/2021 | Ying | H04W 76/12 |
| 2021/0385716 A1* | 12/2021 | Bae | H04W 76/30 |
| 2022/0116898 A1* | 4/2022 | Ying | H04W 56/0015 |
| 2022/0330129 A1* | 10/2022 | Yao | H04W 40/24 |

OTHER PUBLICATIONS

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.1.0, Mar. 2019, pp. 1-91.

"3rd Generation Partnership Project; Technical Specification Group Core Network and Terminals; 5G System; Network Exposure Function Northbound APIs; Stage 3 (Release 15)", 3GPP TS 29.522, V15.3.0, Mar. 2019, pp. 1-32.

"3rd Generation Partnership Project; Technical Specification Group Core Network and Terminals; 5G System; Unified Data Management Services; Stage 3 (Release 16)", 3GPP TS 29.503, V16.1.0, Sep. 2019, pp. 1-234.

"3rd Generation Partnership Project; Technical Specification Group Core Network and Terminals; 5G System; Session Management Event Exposure Service; Stage 3 (Release 16)", 3GPP TS 29.508, V16.1.0, Sep. 2019, pp. 1-40.

International Search Report and Written Opinion received for corresponding Patent Cooperation Treaty Application No. PCT/EP2020/081335, dated Jan. 29, 2021, 13 pages.

"3rd Generation Partnership Project; Technical Specification Group Services and System Aspects; System Architecture for the 5G System (5GS); Stage 2 (Release 16)", 3GPP TS 23.501, V16.2.0, Sep. 2019, pp. 1-391.

* cited by examiner

DETECTION AND TRIGGERING FOR UE-TO-UE P2P TRAFFIC FLOW ROUTING OPTIMIZATION

RELATED APPLICATION

This application claims priority to PCT Application No. PCT/EP2020/081335, filed on Nov. 6, 2020, which claims priority to EP Application Serial No. 19207919.2, filed on Nov. 8, 2019, each of which is incorporated herein by reference in its entirety.

FIELD OF THE INVENTION

The present invention relates to an apparatus, a method and a computer program product for detection and triggering for UE-TO-UE P2P traffic flow routing optimization.

RELATED BACKGROUND ART

The following meanings for the abbreviations used in this specification apply:
3GPP: 3$^{rd}$ Generation Partnership Project
5GC: 5G Core Network
AF: Application Function
API: Application Programming Interface
DNAI: Data Network Access Identifier
DNN: Data Network Name
I-UPF: Intermediate UPF
IP: Internet Protocol
LAN: Local Area Network
NAT: Network Address Translation
NEF: Network Exposure Function
NF: Network Function
P2P: Peer-to-Peer
PDU: Protocol Data Unit
PSA: PDU Session Anchor
RAN: Radio Access Network
SMF: Session Management Function
TCP: Transmission Control Protocol
UDP: User Datagram Protocol
UE: User Equipment
UL CL: Uplink Classifier
ULI: User Location Information
UPF: User Plane Function
VR: Virtual Reality Example embodiments, although not limited to this, relate to managing traffic between UEs.

In general, most traffic in the Internet and other networks is between "client" devices and "servers". The clients are often mobile, such as cellular connected wireless devices, while servers are mostly located in data centers or other fixed locations. 3GPP and related standards have focused quite a lot on how to minimize delay between a wireless client and a fixed server, with methods such as local breakout, locally deployed User Plane Functions (UPF) and "edge cloud" in general. However, in some applications, called Peer-to-Peer (P2P) applications, devices (UEs) also communicate with each other over the network. Examples include real-time communication (audio, video, two-player gaming, VR) and content sharing. It is also possible that in the future more "servers" (such as industrial controllers) are deployed wirelessly connected, meaning also some of the client-server communication will in fact also be UE-to-UE communication. The communication can be IP or (especially in industrial use) Ethernet based.

Many these types of applications benefit from low latency, so the network should serve them via shortest possible route. When the UEs are mobile, the shortest route can change dynamically.

Hence, it is advantageous to optimize a route between UEs.

SUMMARY OF THE INVENTION

Example embodiments of the present invention address this situation aim to provide measures to enable establishing of optimized routes between UEs.

According to a first aspect, an apparatus is provided, in an application function, which comprises: at least one processor and at least one memory including computer program code, the at least one memory and the computer program code configured to, with the at least one processor, cause the apparatus at least to perform: detecting whether a first user equipment is present in an area served by a user plane function, and, when it is detected that the first user equipment is present in the area served by the user plane function, storing information about the presence of the first user equipment and controlling whether and when to allocate the first user equipment to the user plane function based on the stored information.

According to a second aspect, a method is provided, in an application function, the method comprising:
 detecting whether a first user equipment is present in an area served by a user plane function, and,
 when it is detected that the first user equipment is present in the area served by the user plane function,
  storing information about the presence of the first user equipment, and
  controlling whether and when to allocate the first user equipment to the user plane function based on the stored information.

The first and second aspects may be modified as follows:
It may be detected whether at least one second user equipment is present in the area served by the user plane function, and, when it is detected that the at least one second user equipment is present in the area served by the user plane function, the first user equipment and the at least one second user equipment may be allocated to the user plane function, and routing information may be provided to the user plane function for setting up a direct route between the first user equipment and the at least second user equipment via the user plane function.

It may be detected whether at least one second user equipment is present in the area served by the user plane function. When it is detected that the at least one second user equipment is present in the area served by the user plane function, the first user equipment and the at least one second user equipment may be allocated to the user plane function, and detection rules may be provided to the user plane function for detecting traffic between the first user equipment and the at least second user equipment.

It may be detected whether at least one second user equipment is present in the area served by the user plane function. When it is detected that the at least one second user equipment is present in the area served by the user plane function, detection rules for detecting traffic between the first user equipment and the at least second user equipment may be provided and the detection rule may be sent to a network control element controlling the user plane function.

The first user equipment and the at least second user equipment may be allocated to the user plane function when the first user equipment and the at least one second user equipment have a specific relationship.

The detection rules may be provided when the first user equipment and the at least one second user equipment have a specific relationship.

It may be detected whether a user equipment is present in the area served by the user plane function by subscribing to traffic influence events concerning the user equipment.

It may be subscribed to traffic influence events by sending a request to a session management function for setting a detection rule for the user plane function element, the detection rule specifying an address of the user equipment the traffic of which is to be detected and an instruction action for the user plane function element to inform the session management function.

It may be detected whether the first user equipment is communicating with the at least one second user equipment, and, when the first user equipment is communicating with the at least second user equipment, routing information may be provided to the user plane function for setting up the direct route between the first user equipment and the at least second user equipment via the user plane function.

It may be detected whether the first user equipment is communicating with the at least one second user equipment, and, when the first user equipment is communicating with the at least second user equipment, the first user equipment and the at least one second user equipment may be allocated to the user plane function and routing information may be provided to the user plane function for setting up the direct route between the first user equipment and the at least second user equipment via the user plane function.

It may be detected whether the first user equipment is communicating with the at least a second user equipment by subscribing to traffic influence events concerning the first and the at least one second user equipment.

The direct route may be set up between the first user equipment and the at least one second user equipment via the specific user plane function by requesting a direct peer to peer connection between the specific user plane function for traffic between the first user equipment and the at least one second user equipment.

According to a third aspect, an apparatus is provided, in a user plane function, comprising: at least one processor and at least one memory including computer program code, the at least one memory and the computer program code configured to, with the at least one processor, cause the apparatus at least to perform: receiving a request from an application function for allocating at least one user equipment to the user plane function, and allocating the at least one user equipment to the user plane function.

According to a fourth aspect a method is provided, in a user plane function, the method comprising:
receiving a request from an application function for allocating at least one user equipment to the user plane function, and
allocating the at least one user equipment to the user plane function.

The third and fourth aspects may be modified as follows:

The at least one user equipment may comprise a first user equipment and at least one second user equipment, wherein a request from the application function for detecting traffic between the first user equipment and the at least one second user equipment may be received, and the traffic between the first user equipment and the at least one second user equipment may be detected based on the request.

The traffic may be detected based on a detection rule which includes an address of a user equipment of which the traffic is to be detected and an action instruction to inform the application function.

Routing information from the application function for setting up a direct peer to peer connection between the first user equipment and at least one second user equipment may be received, and traffic between the first user equipment and the at least one second user equipment may be forwarded based on the routing information.

The requests from the application function may be received via a session management function.

The application function may be informed via the session management function, and the routing information may be received via the session management function.

According to a fifth aspect, an apparatus is provided, in a user plane function, comprising: at least one processor and at least one memory including computer program code, the at least one memory and the computer program code configured to, with the at least one processor, cause the apparatus at least to perform: receiving a request for allocating at least one user equipment to a user plane function from an application function, and instructing the user plane function to allocate the at least one user equipment to the user plane function.

According to a sixth aspect a method is provided, in a session management function, the method comprising:
receiving a request for allocating at least one user equipment to a user plane function from an application function, and
instructing the user plane function to allocate the at least one user equipment to the user plane function.

The fifth and sixth aspects may be modified as follows:

The at least one user equipment may comprise a first user equipment and at least one second user equipment, wherein the user plane function may be instructed to detect traffic between the first user equipment and the at least one second user equipment based on a request received from the application function.

The user plane function may be instructed to detect the traffic by preparing a detection rule which includes an address of a user equipment of which the traffic is to be detected and an action instruction to inform the session management function when traffic is detected, and sending the detection rule to the user plane function, and the application function may be informed when being informed by the user plane function that traffic is detected.

A request may be received from the application function for setting up a direct peer to peer connection between the first user equipment and at least one second user equipment, routing information may be prepared based on the request from the application function, and the user plane function may be instructed to set up the direct peer to peer connection based on the routing information.

According to all aspects and modifications, the routing information may contain routing rules specifying, for traffic from the first user equipment to the at least one second user equipment, an address of the at least one second user equipment and an action instruction for the user plane function to forward traffic to the at least one second user equipment, and/or routing rules specifying, for traffic from the at least one second user equipment to the first user equipment, an address of the first user equipment and an action instruction for the user plane function to forward traffic to the first user equipment.

According to a seventh aspect of the present invention a computer program product is provided which comprises code means for performing a method according to any one of the second, fourth and sixth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to an eighth aspect an apparatus is provided, which comprises means for detecting whether a first user equipment is present in an area served by a user plane function, and, means for, when it is detected that the first user equipment is present in the area served by the user plane function, storing information about the presence of the first user equipment, and controlling whether and when to allocate the first user equipment to the user plane function based on the stored information.

According to a ninth aspect an apparatus is provided, which comprises means for receiving a request from an application function for allocating at least one user equipment to the user plane function, and means for allocating the at least one user equipment to the user plane function.

According to a tenth aspect an apparatus is provided, which comprises means for receiving a request for allocating at least one user equipment to a user plane function from an application function, and means for instructing the user plane function to allocate the at least one user equipment to the user plane function.

The eighth to tenth aspects may be modified similar as the first, third and fifth aspects.

BRIEF DESCRIPTION OF THE DRAWINGS

These and other objects, features, details and advantages will become more fully apparent from the following detailed description of example embodiments of the present invention which is to be taken in conjunction with the appended drawings, in which.

DETAILED DESCRIPTION OF EXAMPLE EMBODIMENTS

In the following, description will be made to example embodiments of the present invention. It is to be understood, however, that the description is given by way of example only, and that the described example embodiments are by no means to be understood as limiting the present invention thereto.

Before describing example embodiments in detail, the problem underlying the present application is described in some more detail.

As mentioned above, example embodiments relate to communications between UEs, in particular P2P communications, wherein many of the applications using P2P communications benefit from low latency. Therefore, so the network should serve these UEs via shortest possible route. When the UEs are mobile, the shortest route can change dynamically. Embodiments of the present invention aim to optimizing the route in situations where there would be an opportunity to serve the UE-to-UE traffic flows via a common local User Plane Function (UPF).

Besides, it is noted that an important aspect of UE-to-UE (or P2P) communication in IP networks is authorization. Quite often direct communication between UEs is by default prohibited by firewalls (or NATs), to prevent unwanted traffic that can for instance exhaust radio capacity and device battery and make the UEs more vulnerable in general. Thus UE-to-UE IP traffic is in most Internet access networks (cellular included) only allowed when both UEs have actually sent (UDP) IP packets towards each other's IP address (and UDP port), which is considered by the firewall a consent of communication. This same policy, if in place, should be followed even when the UE-to-UE IP routing is optimized.

The problem underlying example embodiments is further described in the following by referring to FIG. 4, which illustrates local routing for P2P traffic flows between UE.

In general, P2P traffic flows between two UEs should be served via the shortest possible route to minimize latency. This is especially relevant when the UEs are in the same area that could be served by the same local/intermediate UPF instead of PDU Session Anchor (PSA).

It is noted that it is possible that the communicating UEs do not even have common PSA, but two separate PSA nodes.

Figure 4:
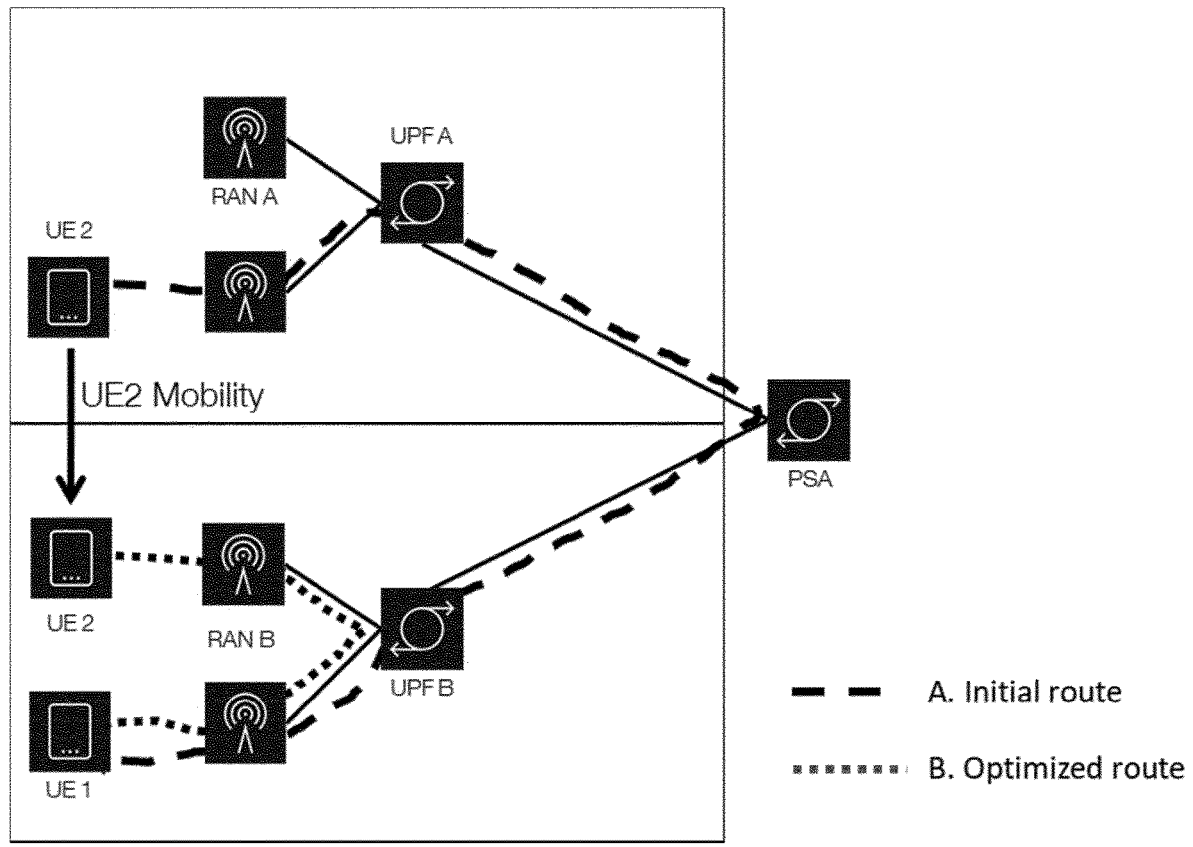
FIG. 4 illustrates local routing for P2P traffic flows between UE.

In the example of FIG. 4, two radio access networks RAN A and RAN B are shown, each of which is associated with a local UPF, namely UPF A and UPF B. A connection between UPF A and UPF B is provided via a PSA.

In this situation, it is assumed that initially UE 2 is connected to RAN A, and UE 1 is connected to RAN B. The UEs may start a P2P traffic flow while in areas served by different local UPFs (dashed line (A)). The local UPF may in that case not be part of the communication path at all.

At some point UE2 moves to the same area as UE1 and in that case it would be possible to route the P2P traffic flow directly by the local UPF (dotted line (B)).

This requires SMF to set related filters on UPF B.

In the following, some elements/procedures as used in some example embodiments in the following are shortly defined:

The SMF may decide to insert in the data path of a PDU Session an Uplink Classifier (3GPP TS 23.501 section 5.6.4). The Uplink Classifier (UL CL) is a functionality supported by an UPF that aims at diverting (locally) some traffic matching traffic filters provided by the SMF. The procedure for addition and removal of Intermediate UPF (UL CL) is described 3GPP TS 23.502 section 4.3.5.4.

Addition and removal of UL CL may be also coordinated between AF and 5GC by SMF via NEF (3GPP TR 23.725 section 6.13.2.2).

NEF TrafficInfluenceAPI can be used to provide Early or Late Notification on user plane path events based on specific event subscription by Application Function (3GPP TS 29.522 section 5.4.3.3.2).

As mentioned above, according to example embodiments, measures are provided by which a route between UEs can be optimized.

In the following, a general overview of some example embodiments is described by referring to FIGS. 1A, 1B, 2A, 2B, 3A and 3B.

Figure 1A:
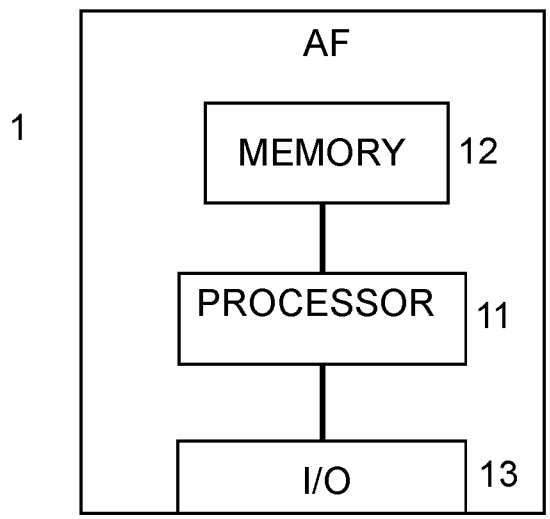
FIG. 1A shows an AF 1 according to an example embodiment.

FIG. 1A shows an AF 1 as an example for a first apparatus according to the present example embodiment. The apparatus may be an application function or a similar network element capable of performing the corresponding functions thereof. The apparatus may the application function or may be a part thereof, or may be an apparatus which includes the functionality of the application function besides other functionalities. A procedure carried out by the AF 1 is illustrated in FIG. 1B.

The AF 1 comprises at least one processor 11 and at least one memory 12 including computer program code. The at least one processor 11, with the at least one memory 12 and the computer program code, is configured to cause the apparatus to perform: detecting whether a first user equipment is present in an area served by a user plane function (as shown in S11 of FIG. 1B), and, when it is detected that the first user equipment is present in the area served by the user plane function, storing information about the presence of the first user equipment (as shown in S12 of FIG. 1B), and controlling whether and when to allocate the first user equipment to the user plane function based on the stored information (as shown in S13 of FIG. 1B).

Figure 1B:
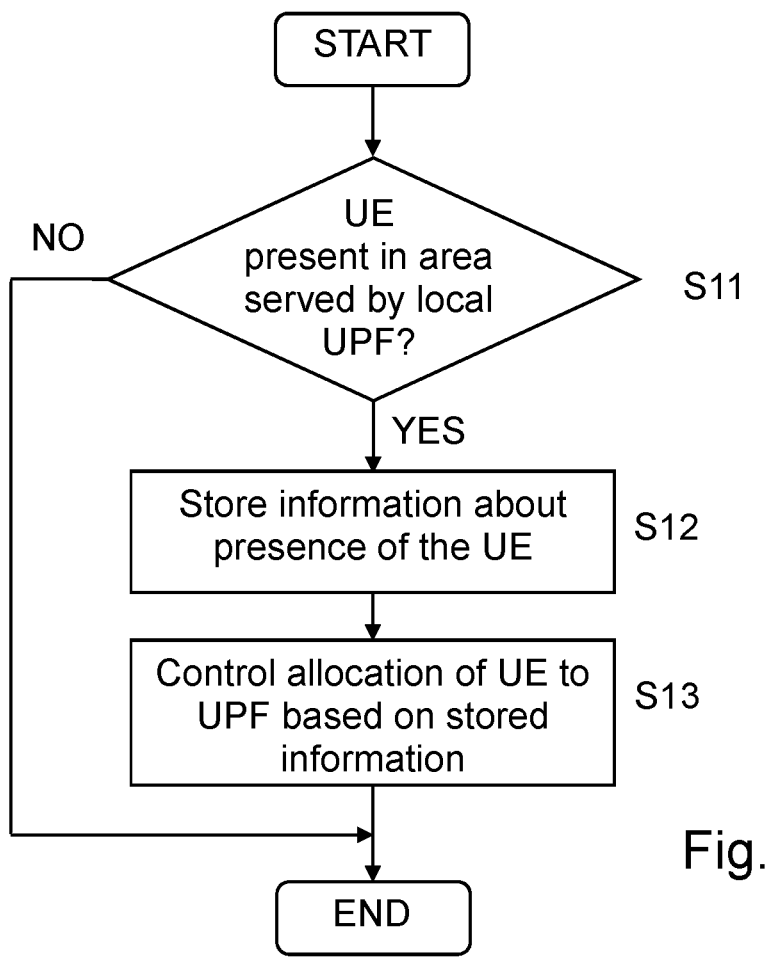
FIG. 1B shows a method carried out by the AF 1 according to the example embodiment.
Figure 2A:
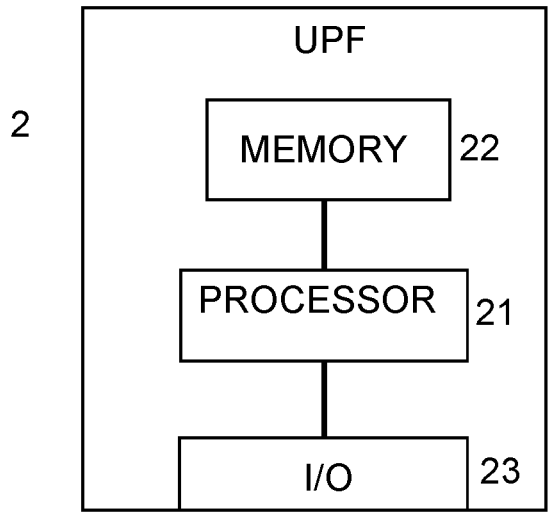
FIG. 2A shows a UPF 2 according to an example embodiment.

That is, in the example of FIG. 1B, in S11 it may be determined whether the first UE is present in the area served by the user plane function (e.g. UPF 2 shown in FIG. 2A). If this is the case (yes in S11), then the information about the presence of the first UE is stored. Otherwise (no in S11), the procedure ends.

Figure 2B:
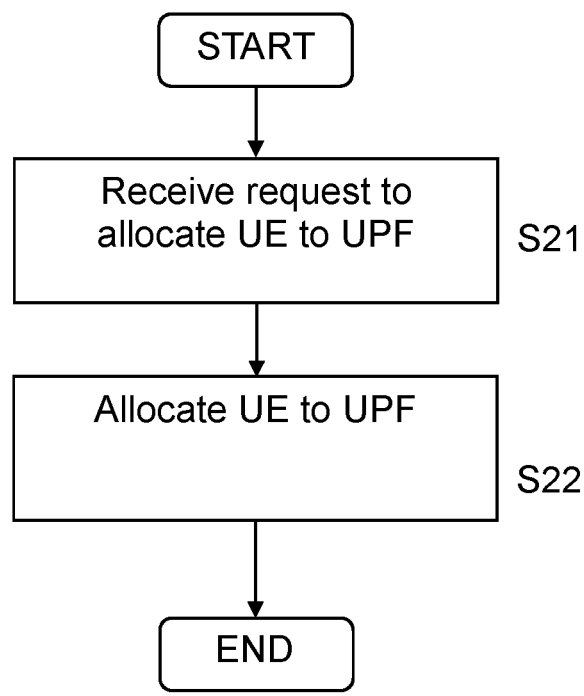
FIG. 2B shows a method carried out by the UPF 2 according to the example embodiment.

FIG. 2A shows a user plane function (UPF) 2 as an example for a second apparatus according to the present example embodiment. The apparatus may be the UPF, or may be a part thereof, or another suitable network element capable of carrying out the corresponding functions. A procedure carried out by the UPF 2 is illustrated in FIG. 2B.

The UPF 2 comprises at least one processor 21 and at least one memory 22 including computer program code. The at least one processor 21, with the at least one memory 22 and the computer program code, is configured to cause the apparatus to perform: receiving a request from an application function (e.g., AF 1 shown in FIG. 1A) for allocating at least one user equipment to the user plane function (as shown in S21 in FIG. 2B), and allocating the at least one user equipment to the user plane function (as shown in S22 of FIG. 2B).

Figure 3A:
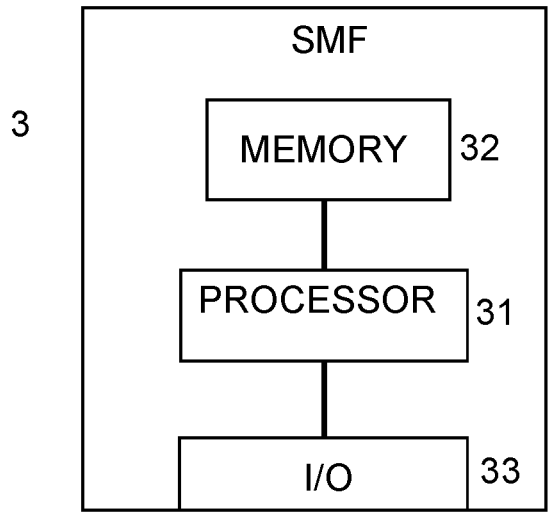
FIG. 3A shows an SMF 2 according to an example embodiment.
Figure 3B:
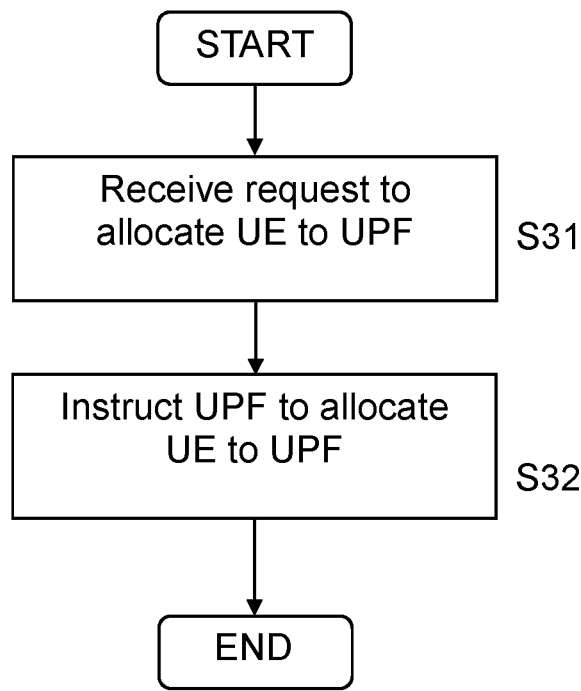
FIG. 3B shows a method carried out by the SMF 2 according to the example embodiment.

FIG. 3A shows a session management function (SMF) 3 as an example for a second apparatus according to the present example embodiment. The third apparatus may be the SMF, or may be a part thereof, or another suitable network element capable of carrying out the corresponding functions. A procedure carried out by the SMF 3 is illustrated in FIG. 3B.

The SMF 3 comprises at least one processor 31 and at least one memory 32 including computer program code. The at least one processor 31, with the at least one memory 32 and the computer program code, is configured to cause the apparatus to perform: receiving a request for allocating at least one user equipment to a user plane function (e.g., UPF 2 shown in FIG. 2A) from an application function (e.g., AF 1 shown in FIG. 1A) (as shown in S31 of FIG. 3B), and instructing the user plane function to allocate the at least one user equipment to the user plane function (as shown in S32 of FIG. 3B).

The AF 1 may further comprise an I/O unit 13, which is capable of transmitting to and receiving from other network elements, the UPF 2 may further comprise an I/O unit 23, which is capable of transmitting to and receiving from other network elements, and, likewise, the SMF 3 may further comprise an I/O unit 33, which is cable of transmitting to and receiving from network elements.

Thus, according to example embodiments, the AF is capable of controlling an allocation of a specific UE to a specific UPF. In this way, the AF is capable of controlling a connection of the UE. For example, when more than one UE are present in the area served by the UPF, the AF can set up a direct route between the UEs via the UPF.

In the following, this is further described by referring to some further detailed embodiments.

According to some example embodiments, a procedure is provided that allows an Application Function (AF) to control P2P routing via a common I-UPFs for UEs having a special relation known by the AF, such as that the two UEs belong to a common group by some definition. In the following the common group membership is used to denote the special relation. The procedure is based on the following main operations:

AF being able to detect whether UEs belonging to the group are in the same area that can be served by a common I-UPF. (This is based on existing procedures.)

AF being able to control when exactly an I-UPF for a UE should be allocated. This is new compared to current 3GPP procedures where the I-UPF allocation for the PDU session is not possible as dynamically as defined here.

AF being able to detect that UEs within a group are sending direct P2P traffic between each other. This is done via a new interface between NEF and AF and mapping from NEF interface to exact traffic filters set by the SMF to I-UPF or PSA-UPF.

AF being able to set a direct route between specific UEs within a group after it has asked for a common I-UPF to be allocated for them. This requires a new interface between NEF and AF and mapping from NEF interface to exact traffic filters set by the SMF to I-UPF.

Setting of filters related to P2P traffic detection and routing in the UPF in an optimal way is achieved by extensions on how the filters are constructed.

It is assumed that UE routing optimization is applied between UEs having a special relation that is known by the AF. According to an example embodiment, the UE routing optimization is only applied between UEs having a special relation that needs only be known by the AF. The relation can be that the two UEs belong to the same group of some kind. For instance, a group can consist of UEs belonging to players engaged at the moment in a common gaming session in which case the group membership may be highly dynamic, or it can consist of UEs supporting a specific application owned by the same company in which case the membership may be much more long term. It is however also possible that the group membership is maintained in the 5G Network so that the group is addressable by the AF. For example, TrafficInfluenceAPI allows "a group of UEs identified by External Group Identifier" (29.522 section 4.4.7.3). In this case the NEF shall interact with the UDM (per 3GPP TS 29.503) to resolve to Internal Group Identifier. This requires that the UEs are part of a group, for instance 23.501 5.6.7.1 and 5.17.6.1. A specific case is "5G VN group" (TS 23.501 section 5.8.2.13).

When an UE enters a new area indicated by User Location Information (ULI) the SMF on receiving such notification sends User Plane Path Change event (early notification) to NEF which notifies the AF. If no other UEs that have a specific relation such as belong to same group are present in the new available User Plane Path (as described by DNAI and other information), the AF refrains requesting addition of new User Plane Path, that is, addition of I-UPF. Instead, the AF stores the new available path information and acknowledges the notification to NEF.

Once NEF notifies AF of another UE with a special relation to the first UE such as that is belongs to the same group entering the same area associated with the same I-UPF the AF requests via NEF (TrafficInfluenceAPI) addition of I-UPF for the first UE and the second UE. AF may request, at the same API invocation, to insert traffic filters to I-UPF describing the P2P flows as the AF has knowledge of both UE's addresses.

Figure 5:
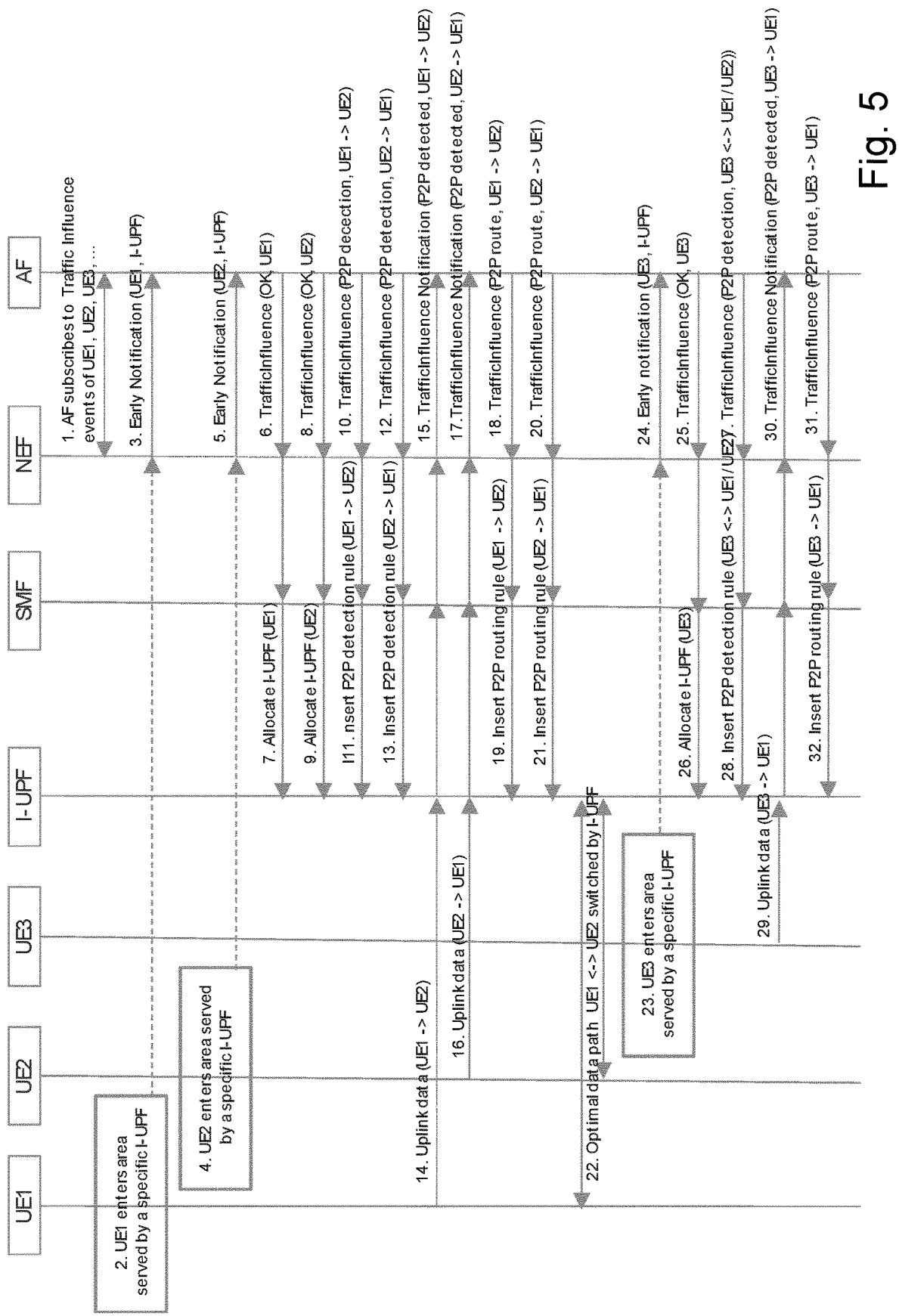
FIG. 5 shows a flow chart of a procedure according to an example embodiment.

The procedures are described in detail by referring to a flowchart shown in FIG. 5. The flowchart shows the most general case where the knowledge of the UEs' relation or group membership and desired P2P flow routing policy is only kept within an external Application Function (AF), which controls the network via an API offered by a Network Exposure Function (NEF). Many of the procedures are based on what is already described in 3GPP Rel 15 and 16, but the specific new parts are:

According to example embodiments, in particular the following new elements are provided:

NEF API that allows AF to request detection of P2P traffic between UEs including a notification by NEF to AF when traffic is detected.

NEF API that allows AF to request direct P2P routing via a common I-UPF for traffic between UEs.

Mapping from these NEF APIs to concrete traffic filters and rules set by the SMF. This mapping includes translation from UE identity to UE IP address.

In the following, the flowchart is described in detail:

In process 1, the AF subscribes via NEF to Traffic Influence events on a group of UEs including UE1, UE2 and UE3.

In process 2, the UE1 enters a specific area where it is possible to allocate a specific I-UPF, i.e., an area served by the specific I-UPF.

In process 3, the AF gets an Early Notification about UE1 being in the specific area (NEF "UP Path Change" event. TS 29.522 section 5.4.3.4.3.) In this case, AF does not immediately ask for I-UPF to be allocated to UE1, as UE1 is the only UE in the group being in the area.

In processes 4-5, the UE2 enters the same area and AF gets a notification, similar as in case of UE1 (processes 2 and 3).

In processes 6-9, as there are now more than one UE in the area, AF asks via NEF for a common I-UPF to be allocated for them.

In particular, in process 6, the AF sends a TrafficInfluence message including "OK, UE1" to the NEF, which forwards this to the SMF. For example, NEF may use Nsmf_EventExposure_AppRelocationInfo Service Operation (TS 29.508 section 4.25) in order to pass the message received via TrafficInfluenceAPI from AF to the SMF. The AckOfNotify (5.6.2.7) data structure as request body that shall include: Notification correlation ID provided by the NF service consumer during UP path change notification, as "notifId" attribute; an identifier of UE (i.e. SUPI or GPSI) if available and the subscription applies to a group of UE(s) or any UE; and information about the AF acknowledgement within the "ackResult" attribute that shall contain result status of the application relocation as "afStatus" attribute. If the "afStatus" attribute sets to "SUCCESS", the N6 traffic routing information associated to the target DNAI may be included as "trafficRoute" attribute. If the application relocation is not completed on time, the "afStatus" attribute shall set to the corresponding failure cause.

In process 7, the SMF sends an Allocate I-UPF request for UE1 to the I-UPF. In process 7, the AF sends a TrafficInfluence message including "OK, UE2" to the NEF, which forwards this to the SMF. In process 9, the SMF sends an Allocate I-UPF request for UE2 to the I-UPF.

In processes 10-13, the AF requests via NEF P2P traffic detection rules to be inserted for traffic between UE1 and UE2, for each direction.

The request(s) from AF to NEF contains the following information:
Type: P2P traffic detection
From: UE1 to: UE2
From: UE2 to: UE1.

Different directions can be requested either at the same time or separately depending on the exact API design.

AF will also subscribe to the events indicating the presence of such traffic.

The NEF and SMF map the UE identities to their IP addresses and SMF inserts a concrete traffic rules to I-UPF:
For the PDU session of UE1:
Direction: Uplink
Destination IP: UE2 IP address
Action: Trigger to SMF
For the PDU sessions of UE2:
Direction: Uplink
Destination IP: UE1 IP address
Action: Trigger to SMF In more detail, in process 10, the AF sends a TrafficInfluence message including "P2P detection, UE1→UE2" to the NEF, which forwards this to the SMF. NEF will pass traffic filters received via TrafficInfluenceAPI to SMF using Nsmf_EventExposure_Subscribe Service Operation (TS 29.508 section 4.2.3).

In process 11, the SMF sends an Insert P2P detection rule request including "UE1→UE2" to the I-UPF. Likewise, in process 12, the AF sends a TrafficInfluence message including "P2P detection, UE2→UE1" to the NEF, which forwards this to the SMF. In process 13, the SMF sends an Insert P2P detection rule request including "UE2→UE1" to the I-UPF.

In processes 14-17, the UE1 and the UE2 send IP packets to each other, respectively, which leads to I-UPF trigger action to SMF and eventually notifications from NEF to AF. The notification can convey transport protocol port numbers of the packets.

In detail, in process 14, uplink data is sent from the UE1 to the UE2 (UE1→UE2) via the I-UPF. This leads to the trigger action to the SMF, so that in process 15, a TrafficInfluence Notification including "P2P detected, UE1→UE2" is sent to the AF. In process 16, uplink data is sent from the UE2 to the UE1 (UE2→UE1) via the I-UPF. This leads to the trigger action to the SMF, so that in process 17, a TrafficInfluence Notification including "P2P detected, UE2→UE1" is sent to the AF. In this way, the AF is notified about the traffic between UE1 and UE2.

In processes 18-21, due to presence of P2P traffic between UE1 and UE2, the AF requests via NEF a direct P2P route to be set at the I-UPF between UE1 and UE2.

The request from AF to NEF contains:
Type: P2P traffic routing
From: UE1 to: UE2. Optionally: Transport protocol and Source and Destination port numbers.
From UE2 to: UE1. Optionally: Transport protocol and Source and Destination port numbers.
The NEF and SMF map the UE identities to their IP addresses and SMF inserts a concrete traffic rules to I-UPF:
For the PDU session of UE1:
Direction: Uplink
Destination IP: UE2 IP address. Optionally: Transport protocol and Source and Destination port numbers.
Action: Forward to UE2 PDU session downlink
For the PDU sessions of UE2:
Direction: Uplink
Destination IP: UE1 IP address. Optionally: Transport protocol and Source and Destination port numbers.
Action: Forward to UE2 PDU session downlink In detail, in process 18, the AF sends a TrafficInfluence message including "P2P route, UE1→UE2" to the NEF. In process 19, the NEF sends an Insert P2P routing rule including "UE1→UE2" to the SMF, which forwards this to the I-UPF. In process 20, the AF sends a TrafficInfluence message including "P2P route, UE2→UE1" to the NEF. In process 21, the NEF sends an Insert P2P routing rule including "UE2→UE1" to the SMF, which forwards this to the I-UPF.

Thus, in process 22, due to the insertion of the routing rules, P2P traffic between UE1 and UE2 is routed directly via the I-UPF without needing to loop via the PSA.

In processes 23-31, a third UE3 is considered. That is, when more UEs belonging to the same group enter the same area, the AF can decide to request the same I-UPF to be allocate for them. It can ask for P2P traffic detection between any pair of UEs in the area and also insert P2P routing rules between any UEs in the area. In this example the AF does this for UE3 and traffic from/to UE3 and UE1 and UE2, respectively.

In particular, in process 23, the UE3 enters the area served by the specific I-UPF.

In process 24, the AF gets an Early Notification about UE3 being in the specific area.

In process 25, the AF sends a TrafficInfluence message including "OK, UE3" to the NEF, which forwards this to the SMF. In process 26, the SMF sends an Allocate I-UPF request for UE3 to the I-UPF.

In process 27, the AF sends a TrafficInfluence message including "P2P detection, UE3→UE1/UE2" to the NEF, which forwards this to the SMF. In process 28, the SMF sends an Insert P2P detection rule request including "UE3→UE1/UE2" to the I-UPF.

Then, in process 29, the UE3 sends data to the UE1 (UE3→UE1) via the I-UPF. This leads to the trigger action to the SMF, so that in process 30, a TrafficInfluence Notification including "P2P detected, UE3→UE1" is sent to the AF.

In process 31, the AF sends a TrafficInfluence message including "P2P route, UE3→UE1" to the NEF. In process 32, the NEF sends an Insert P2P routing rule including "UE3→UE1" to the SMF, which forwards this to the I-UPF.

Thus, thereafter also the UE3 can transmit data to the UE1 directly via the I-UPF. A similar procedure is carried out when the UE3 sends data to the UE2, or when the UE1 sends data to the UE3 etc.

When UEs leave the area the routing rules related to them are removed from the I-UPF and the AF is notified about the change.

In the following, procedures according to some example embodiments as described above are summarized by referring to FIGS. 6 to 8.

In particular, it is noted that, when the first UE enters the area served by a local UPF, it is not yet necessary to allocate that UPF (as an I-UPF) for that UE, but it is enough for an AF to store that information for future use. It is possible to do the allocation immediately, but this adds overhead if there is no local or P2P traffic from the UE.

When another UE with a special relationship with the first UE is present in the same area, one of these three actions are taken:

Case 1: A common I-UPF is allocated and routing rules for direct UE-to-UE traffic are set for this I-UPF.

Case 2: A common I-UPF is allocated but only rules for detecting direct UE-to-UE traffic are set for this I-UPF.

Case 3: A common I-UPF is not yet allocated but only rules for detecting direct UE-to-UE traffic are set at a higher layer UPF(s).

For cases 2 and 3, after the UE-to-UE traffic detection shows such traffic is present, a common I-UPF is allocated. In this way, it is possible to avoid unnecessary insertion and execution of rules that may need to be used very rarely. However, in some cases case 1 (allocating a common I-UPF after detecting a second UE) may be advantageous, for instance if it is important to be ready already when the very first UE-to-UE packets are sent.

Figure 6:
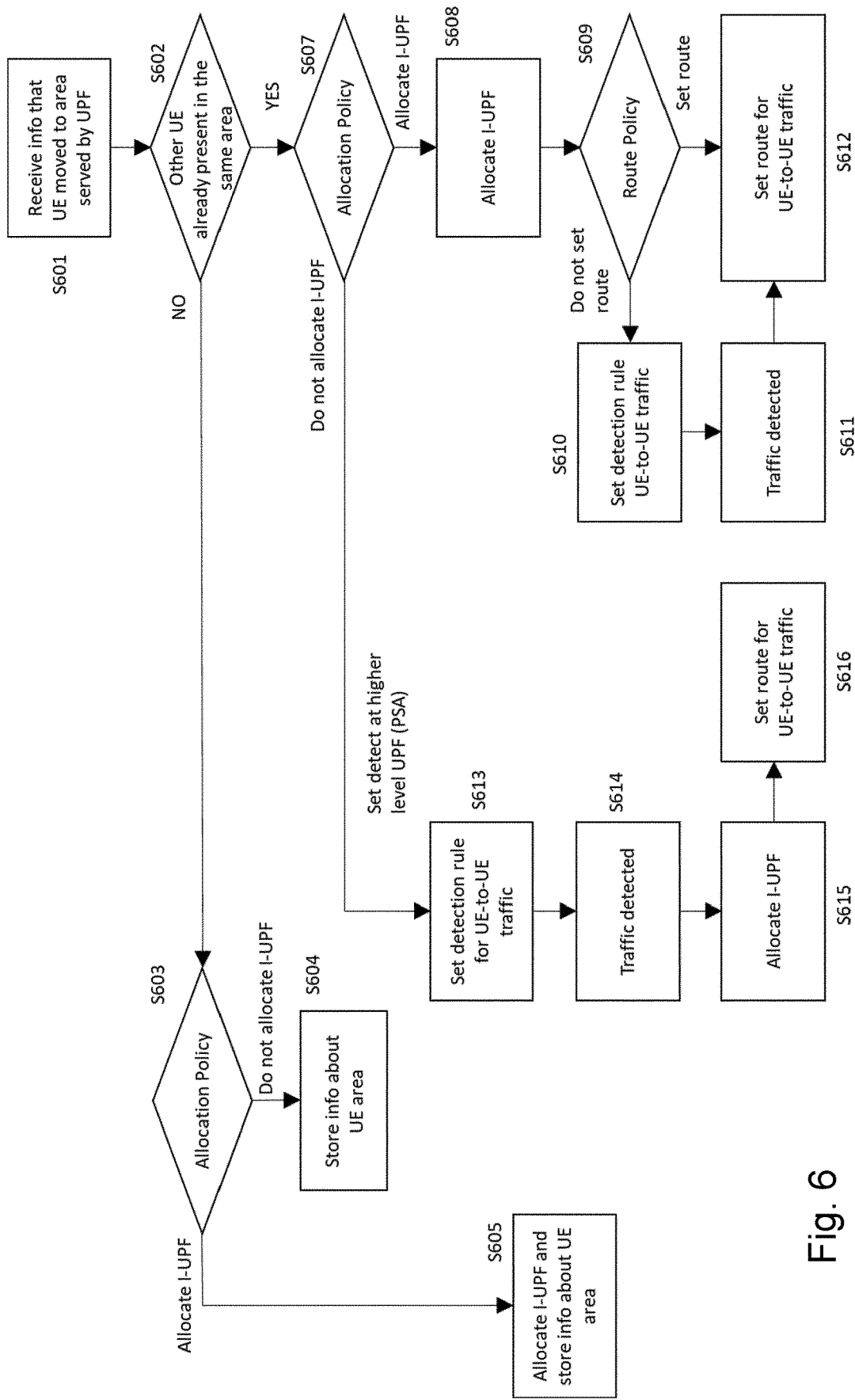
FIG. 6 illustrates a decision tree of the AF according to an example embodiment.

The above procedures are described in more detail by referring to the flow chart shown in FIG. 6, which shows a process carried out by the AF 1 shown in FIG. 1A, for example.

In S601, the AF receives information that an UE has moved to an area served by an UPF (local UPF).

In S602, it is determined whether there is another UE already present in the same area.

If this is not the case (NO in S602), the process advances to S603. In S603, the allocation policy is considered. In particular, if the allocation policy is "Allocate an I-UPF", then the process advances to S605, in which the AF allocates the UE to the I-UPF and stores information about the UE area (information about the presence of the UE). If the allocation policy in S603 is "Do not allocate an I-UPF", the process advances to S604, in which the AF only stores the information about the UE area.

When in S602 it is determined that another UE is already present in the same area ("YES"), the process advances to S607.

In S607, the allocation policy is considered, similar as in S603. If the allocation policy in S607 is "Allocate an I-UPF", the process advances to S608, in which the AF allocates the both UEs to the I-UPF (e.g., processes 6 to 8 in FIG. 5).

In S609, the route policy is considered. When the route policy is "Set route", i.e., when a route for direct UE-to-UE traffic is to be set, the process advances to S612, in which the AF sets the route for UE-to-UE traffic, wherein, for example, the AF sends the request to the UPF including the routing rules, as described above.

When the route policy is "Do not set route", i.e., when a route for direct UE-to-UE traffic is not to be set yet, the process advances to S610, in which the
AF sets a detection rule for UE-to-UE (e.g., processes 10 to 13 in FIG. 5). In S611, it is assumed that traffic is detected (e.g., processes 15 and 17 in FIG. 5). Then, the process advances to S612, in which the AF sets the route for UE-to-UE traffic (e.g., processes 19 to 21 in FIG. 5).

If the allocation policy in S607 is "Do not allocate an I-UPF", the process advances to S604, in which the AF only stores the information about the UE area. In this case, the detection is set at a higher level UPF, for example PSA. Thus, in S613, the AF sets the detection rule for UE-to-UE traffic, similar as in case of S610. In S614, it is assumed that traffic is detected. Then, in S615, the AF allocates the I-UPF to the UEs, and in S616, the AF sets the route for UE-to-UE traffic, similar as in S612.

Thus, case 1 described above corresponds to the following branch: S601, S602 (YES), S603 (Allocate I-UPF), S608, S609 (YES), S612.

Case 2 described above corresponds to the following branch: S601, S602 (YES), S603 (Allocate I-UPF), S608, S609 (NO), S610, S611, S612.

Case 3 described above corresponds to the following branch: S601, S602 (YES), S603 (Do not allocate I-UPF), S613, S614, S615, S616.

Figure 7:
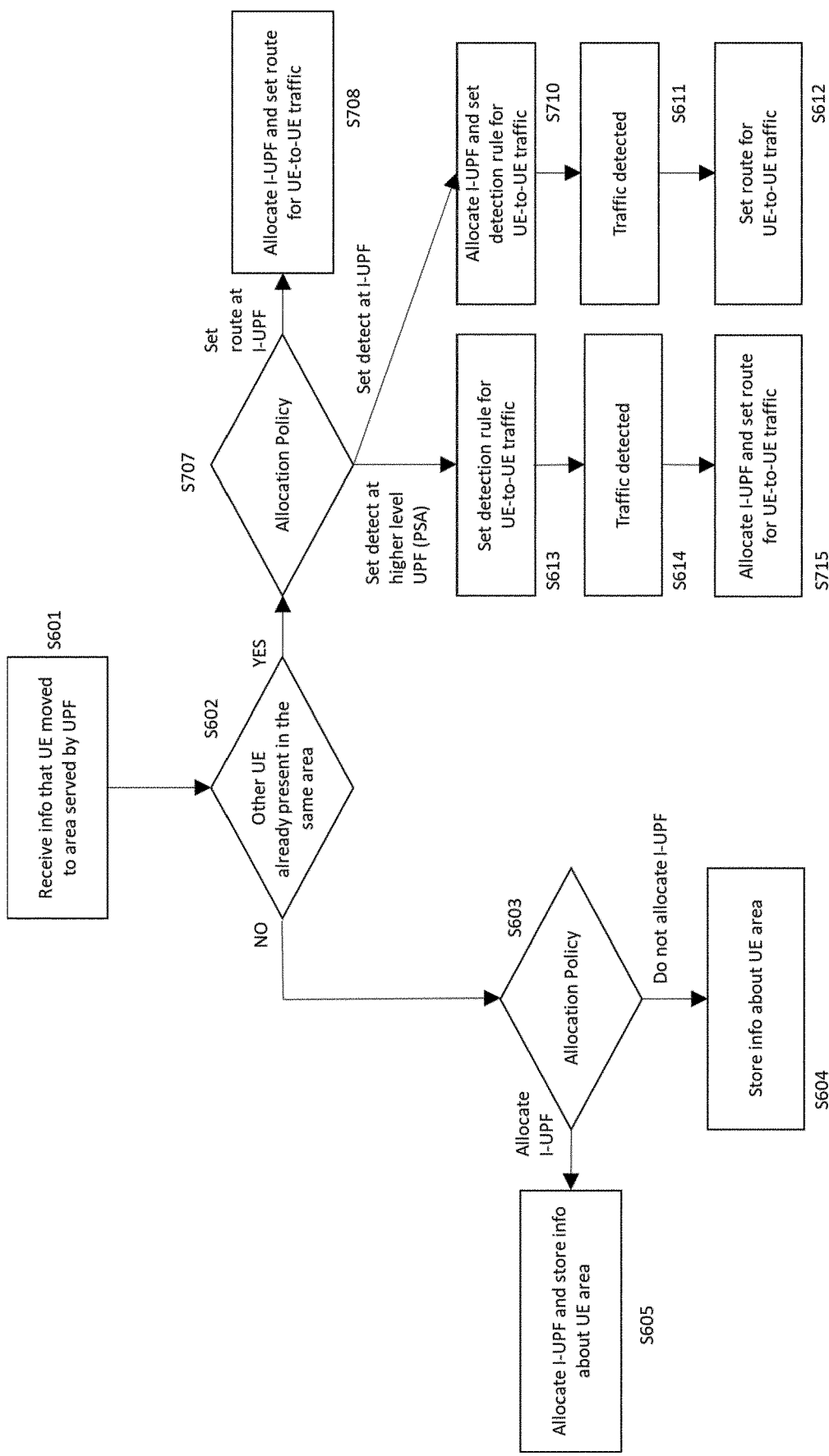
FIG. 7 illustrates an alternative decision tree of the AF according to an example embodiment.

FIG. 7 shows a flow chart of an alternative procedure carried out by the AF according to an example embodiment. The flow chart is similar to that of FIG. 6, so that in the following only the differences are described. In particular, process denoted with the same reference characters as in FIG. 6 are the same.

The procedure according to FIG. 7 differs in the determination of the allocation policy, as shown in process S707. That is, after it is determined in S602 that another UE is already present in the same area (YES in S602), the process advances to S707, in which the allocation policy is considered. In this example, three alternatives are possible: "Set route at I-UPF" (which corresponds to case 1 described above), "Set detect at I-UPF" (which corresponds to case 2 described above), and "Set detect at higher level UPF (PSA)" (which corresponds to case 3 described above).

Thus, when the allocation policy is "Set route at I-UPF", the process advances to S708, in which the AF allocates the I-UPF and sets route for UE-to-UE traffic.

When the allocation policy is "Set detect at I-UPF", the process advances to S710, in which the AF allocates the I-UPF and sets a detection rule for UE-to-UE traffic. Thereafter, process S611 and S612 described above follow.

When the allocation policy is "Set detect at higher UPF (PSA)", the process advances to S613, in which the AF sets the detection rule for UE-to-UE traffic, as described above. In S614, it is assumed that traffic is detected. Thus, in S715, the AF allocates the I-UPF and sets route for UE-to-UE traffic (corresponding to a combination of S615 and S616 in FIG. 6).

Figure 8:
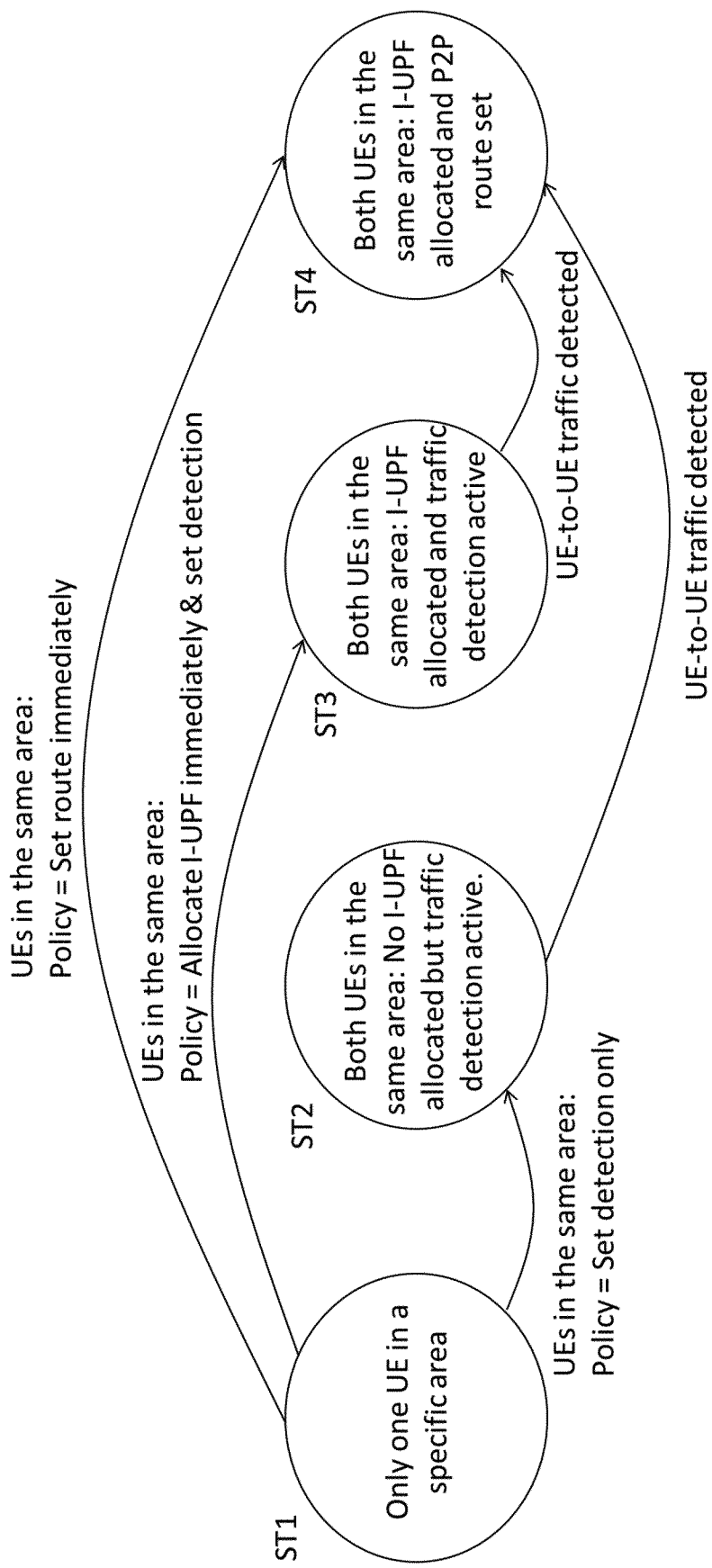
FIG. 8 illustrates an AF state machine according to an example embodiment.

Moreover, the above procedure is also illustrated by referring to a state machine shown in FIG. 8.

The state ST1 is that only one UE is in a specific area. The state ST2 is that both UEs are in the same area, wherein no I-UPF will be allocated yet, but traffic detection at a higher level UPF is active. The state ST3 is that both UEs are in the same area, wherein an I-UPF is allocated and traffic detection is active. The state ST4 is that both UIEs are in the same area, wherein an I-UPF is allocated and a P2P route is set.

The state transitions depend on the policies, similar as described above with respect to FIGS. 6 and 7. Thus, when it is detected that there are two UEs in the same area, a transition from ST1 to ST2 is effected when the policy is that detection only is set, a transition from ST1 to ST3 is effected when the policy is to allocate an I-UPF immediately and to set detection, and a transition from ST1 to ST4 is effected when the policy is to set the route immediately. Transitions from ST2 to ST4 and from ST3 to ST4 are effected when UE-to-UE traffic is detected.

The different policies (allocation policy, routing policy) may be pre-configured in the network. Alternatively, they may also be changed by the AF and/or a higher order network control element based on network load, AF load or other criteria.

Thus, according to some example embodiments, it is possible to provide a direct P2P connection of UEs via an I-UPF, without requiring to transmit data via a PSA.

The above-described example embodiments are only examples and may be modified.

For example, the group membership and P2P traffic routing policy can be outsourced from an external AF to a network internal AF or even a specialized Network Function (NF) that would not use NEF but would perform the procedures directly over the network-internal NF interfaces. In this way, the message exchange between AF and NEF shown in FIG. 5 is not necessary.

The group membership can be based on network-level factors such as all UEs connecting to a common Data Network (with a specific) DNN or using a common slice could be automatically mapped to a common group which has a common P2P routing policy.

The AF can request I-UPF allocation already for the first UE entering an area.

The AF can request P2P routing rules to be set on an I-UPF for a UE as soon as the I-UPF for that UE has been allocated. It does not have to use P2P traffic detection as a trigger to that. Neither has it even wait for the other UEs to enter the area.

P2P traffic detection can also be done by a downlink filter where the source IP addresses are compared to those provided by the AF (via NEF to SMF).

P2P traffic detection can happen also on the application layer and be known that way to the AF.

P2P traffic detection can happen also within the PSA, and even for UEs not being in the same area.

In addition to IP traffic, the procedures can be applied to Ethernet PDU sessions, using source and destination MAC addresses as well as 802.1Q tags.

According to some example embodiments, it is determined whether the UEs, which are to communicate by a direct P2P connection via the UPF, belong to a certain group. However, example embodiments are not limited to this, and it is not necessary that the UEs belong to a certain group.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22, 32 and executable by the processor (processing resources, processing circuitry) 11, 21, 31 or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22, 32 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21, 31 may be of any type suitable to the local technical environment, and may include one or more of general purpose computers, special purpose computers, microprocessors, digital signal processors (DSPs) and processors based on a multi core processor architecture, as non-limiting examples.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, in a user plane function, comprising:
at least one processor and at least one memory including computer program code, the at least one memory and the computer program code configured to, with the at least one processor, cause the apparatus at least to perform:
informing an application function via a session management function,
receiving a request from the application function for allocating at least one user equipment to the user plane function, wherein the at least one user equipment comprises a first user equipment and at least one second user equipment, and wherein the requests from the application function are received via the session management function,
transmitting, by the application function, a TrafficInfluence message to a network exposure function, wherein the network exposure function uses Nsmf_EventExposure_AppRelocationInfo Service Operation to pass the TrafficInfluence message from the application function to the session management function,
allocating the at least one user equipment to the user plane function,
receiving a request from the application function for detecting traffic between the first user equipment and the at least one second user equipment,
detecting the traffic between the first user equipment and the at least one second user equipment based on the request,
receiving a routing information from the application function via the session management function for setting up a direct peer to peer connection between the first user equipment and the at least one second user equipment, wherein the routing information contains:
routing rules specifying, for traffic from the first user equipment to the at least one second user equipment, an address of the at least one second user equipment and an action instruction for the user plane function to forward traffic to the at least one second user equipment, and
routing rules specifying, for the traffic from the at least one second user equipment to the first user equipment, an address of the first user equipment and an action instruction for the user plane function to forward the traffic to the first user equipment, and
forwarding the traffic between the first user equipment and the at least one second user equipment based on the routing information.

\* \* \* \* \*